(12) United States Patent
Kenmotsu et al.

(10) Patent No.: US 10,286,741 B2
(45) Date of Patent: May 14, 2019

(54) SUSPENSION ARM FOR VEHICLE (71) Applicants: F-TECH INC., Kuki-shi, Saitama (JP); HONDA MOTOR CO., LTD., Tokyo (JP)

(72) Inventors: Yohei Kenmotsu, Tochigi (JP); Yasutaka Ohta, Wako (JP)

(73) Assignees: F-TECH INC., Kuki-shi (JP); HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 15/561,601

(22) PCT Filed: Apr. 4, 2016

(86) PCT No.: PCT/JP2016/061015
§ 371 (c)(1),
(2) Date: Sep. 26, 2017

(87) PCT Pub. No.: WO2016/167151
PCT Pub. Date: Oct. 20, 2016

(65) Prior Publication Data
US 2018/0065437 A1    Mar. 8, 2018

(30) Foreign Application Priority Data

Apr. 13, 2015  (JP) ................................ 2015-081750

(51) Int. Cl.
*B60G 7/00* (2006.01)
(52) U.S. Cl.
CPC ............. *B60G 7/008* (2013.01); *B60G 7/001* (2013.01); *B60G 2206/122* (2013.01); *B60G 2206/8103* (2013.01)

(58) Field of Classification Search
CPC .......................... B60G 7/001; B60G 2206/122
See application file for complete search history.

(56) References Cited

U.S. PATENT DOCUMENTS

| 4,986,566 A * | 1/1991 | Nishino | ................... B60G 3/20 |
| | | | 280/124.143 |
| 5,992,867 A * | 11/1999 | Kato | ........................ B60G 3/06 |
| | | | 280/124.134 |

(Continued)

FOREIGN PATENT DOCUMENTS

| DE | 102004009722 A1 * | 9/2005 | ............. B60G 7/001 |
| DE | 102015212766 A1 * | 1/2017 | ............. B60G 7/001 |

(Continued)

OTHER PUBLICATIONS

International Search Report dated Jun. 21, 2016, issued in counterpart application No. PCT/JP2016/061015. (2 pages).

*Primary Examiner* — Nicole T Verley
(74) *Attorney, Agent, or Firm* — Westerman, Hattori, Daniels & Adrian, LLP (57) ABSTRACT

To provide a suspension arm (1), in which a flange switching portion (100) where an outward flange (90) and a second inward flange (82) are switched with each other is provided between the second inward flange (82) extending at least between an inner wall (53) of a second vehicle-body attachment portion (A2) and a concave wall portion (81), and the outward flange (90) extending over the concave wall portion (81) of a third vertical wall (80) and a rear wall (42) of a first vehicle-body attachment portion (A1), corresponding to a portion where a lower end of the concave wall portion (81) is suspended downward without folding the lower end of the concave wall portion (81).

8 Claims, 6 Drawing Sheets

(56) References Cited

U.S. PATENT DOCUMENTS

| | | | | |
|---|---|---|---|---|
| 7,293,787 | B2 * | 11/2007 | Nunez | B60G 7/001 |
| | | | | 280/124.1 |
| 7,556,273 | B2 * | 7/2009 | Streubel | B60G 7/001 |
| | | | | 264/261 |
| 8,388,001 | B2 * | 3/2013 | Mielke | B60G 7/001 |
| | | | | 280/124.134 |
| 8,398,102 | B2 * | 3/2013 | Monchiero | B60G 7/001 |
| | | | | 280/124.125 |
| 8,690,176 | B2 * | 4/2014 | Perry | B21D 53/88 |
| | | | | 280/124.134 |
| 8,752,850 | B2 * | 6/2014 | Ueno | B60G 7/001 |
| | | | | 280/124.121 |
| 9,278,595 | B2 * | 3/2016 | Ohta | B60G 7/02 |
| 9,457,636 | B2 * | 10/2016 | Minoda | B60G 21/055 |
| 9,561,699 | B2 * | 2/2017 | Haselhorst | B60G 7/001 |
| 9,937,764 | B2 * | 4/2018 | Ito | B21D 22/26 |
| 10,081,044 | B2 * | 9/2018 | Haselhorst | B21D 53/88 |
| 2011/0115186 | A1 | 5/2011 | Chiku et al. | |
| 2016/0243911 | A1 * | 8/2016 | Wohlers | B60G 7/001 |
| 2018/0154719 | A1 * | 6/2018 | Kwon | B29C 45/14 |
| 2018/0312024 | A1 * | 11/2018 | Meyer | B29C 45/14491 |

FOREIGN PATENT DOCUMENTS

| | | | | |
|---|---|---|---|---|
| DE | 102016220165 A1 * | 4/2018 | | B60G 7/001 |
| EP | 1223058 A2 | 7/2002 | | |
| EP | 1223058 A3 | 9/2003 | | |
| EP | 2295269 A1 | 3/2011 | | |
| EP | 3398796 A2 * | 11/2018 | | B29C 45/14 |
| JP | 2002-205520 A | 7/2002 | | |
| JP | 2003-300405 A | 10/2003 | | |
| JP | 2012-158200 A | 8/2012 | | |
| WO | 2010/004899 A1 | 1/2010 | | |

\* cited by examiner

SUSPENSION ARM FOR VEHICLE

TECHNICAL FIELD

The present invention relates to a suspension arm for a vehicle, and more particularly relates to a suspension arm for a vehicle mounted on a vehicle such as an automobile.

BACKGROUND ART

In recent years, in a suspension arm mounted on a vehicle such as an automobile, one piece of steel plate is often press-formed to form the suspension arm in order to achieve light weight and cost reduction of the vehicle.

Under such circumstances, Patent Document 1 relates to a suspension arm of an automobile, and discloses a configuration in which a notched portion is formed in a vertical wall portion connecting between a front attachment portion and a rear attachment portion, in order to prevent stress concentration on a collar welded portion without increasing the number of components and the cost.

PRIOR ART DOCUMENT

Patent Document

Patent Document 1: Japanese Patent Application Laid-open Publication No. 2003-300405

SUMMARY OF THE INVENTION

Problem to be Solved by the Invention

However, according to the studies made by the present inventors, in Patent Document 1, by forming the notched portion in the vertical wall portion, stress concentration on the collar welded portion can be avoided. However, by forming the notched portion, such a tendency can be considered that the strength and the stiffness of the vertical wall portion decrease, and thus, from a viewpoint of ensuring the strength and the stiffness required as a suspension arm, there is still room for improvement.

Further, according to the studies made by the present inventors, a suspension arm having a novel configuration that can increase the strength and the stiffness, while ensuring the required productivity has been desired strongly.

The present invention has been achieved in view of the above problems, and an object of the present invention is to provide a suspension arm for a vehicle that can increase the strength and the stiffness, while ensuring required productivity, with a simple configuration.

Means for Solving the Problem

In order to achieve the above object, a suspension arm for a vehicle according to a first aspect of the present invention comprises: a wheel attachment portion to which wheels are attached; a first vehicle-body attachment portion provided at a position inside in a width direction of a vehicle body with respect to the wheel attachment portion; a second vehicle-body attachment portion provided at a position on a rear side in a front-rear direction of the vehicle body with respect to the first vehicle-body attachment portion; a first vertical wall that extends to connect the wheel attachment portion and the first vehicle-body attachment portion with each other; a second vertical wall that extends to connect the wheel attachment portion and the second vehicle-body attachment portion with each other; a third vertical wall that extends to connect the first vehicle-body attachment portion and the second vehicle-body attachment portion with each other; an upper wall that extends to connect an upper end of the first vertical wall, an upper end of the second vertical wall, and an upper end of the third vertical wall with each other; an inner concave portion defined by the first vertical wall, the second vertical wall, the third vertical wall, and the upper wall, and opening downward in a vertical direction of the vehicle body; a concave wall portion provided in such a manner that the third vertical wall is depressed toward the inner concave portion between the first vehicle-body attachment portion and the second vehicle-body attachment portion; a first inward flange obtained by folding a lower end of the second vertical wall on the second vehicle-body attachment portion side toward the inner concave portion; a second inward flange obtained by folding a lower end of the third vertical wall on the second vehicle-body attachment portion side toward the inner concave portion; and an outward flange obtained by folding a lower end of the third vertical wall on the first vehicle-body attachment portion side toward an opposite side to the inner concave portion, wherein the second inward flange extends at least between the second vehicle-body attachment portion and the concave wall portion, the outward flange extends over the first vehicle-body attachment portion and the concave wall portion to connect them, and a flange switching portion where the second inward flange and the outward flange are switched with each other is provided between the second inward flange and the outward flange corresponding to a portion where a lower end of the concave wall portion is suspended to the downward side without folding the lower end of the concave wall portion.

According to a second aspect of the present invention, in addition to the first aspect, the flange switching portion is provided in a curved wall that connects a first flat wall located on the first vehicle-body attachment portion side with a second flat wall located on the second vehicle-body attachment portion side.

According to a third aspect of the present invention, in addition to the first or second aspect, the second inward flange extends over the second vehicle-body attachment portion and the concave wall portion to connect them.

According to a fourth aspect of the present invention, in addition to any of the first to third aspects, the third vertical wall in a connection portion between the second inward flange and the flange switching portion is provided in a protruding manner to the downward side.

According to a fifth aspect of the present invention, in addition to any of the first to fourth aspects, the outward flange includes a flat portion at an end thereof.

According to a sixth aspect of the present invention, in addition to any of the first to fifth aspects, the first vehicle-body attachment portion includes a front wall being a part of the first vertical wall, and a rear wall being a part of the third vertical wall and facing the front wall in the front-rear direction.

According to a seventh aspect of the present invention, in addition to any of the first to sixth aspects, the second vehicle-body attachment portion includes an outer wall being a part of the second vertical wall, an inner wall being a part of the third vertical wall, a rear upper wall being a part of the upper wall, a first bottom wall being a part of the first inward flange, and a second bottom wall being a part of the second inward flange.

According to an eighth aspect of the present invention, in addition to any of the first to sixth aspects, the second vehicle-body attachment portion includes an outer wall being a part of the second vertical wall, an inner wall being a part of the third vertical wall, a rear upper wall being a part of the upper wall, and a rear attachment hole that penetrates the rear upper wall.

Effect of the Invention

According to the configuration of the first aspect of the present invention, a flange switching portion where a second inward flange and an outward flange are switched with each other is provided between the second inward flange extending at least between a second vehicle-body attachment portion and a concave wall portion and the outward flange extending over a first vehicle-body attachment portion and the concave wall portion to connect them, corresponding to a portion where a lower end of the concave wall portion is suspended downward without folding the lower end of the concave wall portion. Therefore, stress concentration on the first vehicle-body attachment portion and the second vehicle-body attachment portion can be decreased to increase the strength and the stiffness of a suspension arm, while ensuring required productivity of the suspension arm including the second inward flange and the outward flange with a simple configuration.

According to the configuration of the second aspect of the present invention, the flange switching portion is provided in a curved wall that connects a first flat wall located on the first vehicle-body attachment portion side with a second flat wall located on the second vehicle-body attachment portion side. Therefore, the curved wall can be formed with high accuracy by improving shape fixability of the concave wall portion at the time of press forming, while further decreasing stress concentration on the first vehicle-body attachment portion. The flange switching portion provided in the curved wall can appropriately ensure flow of a base material at the time of press forming, and the second inward flange and the outward flange can be formed with high accuracy.

According to the configuration of the third aspect of the present invention, the second inward flange extends over the second vehicle-body attachment portion and the concave wall portion to connect them. Accordingly, size setting flexibility of the second vehicle-body attachment portion can be increased, and the strength and the stiffness of the second vehicle-body attachment portion can be increased.

According to the configuration of the fourth aspect of the present invention, a third vertical wall in a connection portion between the second inward flange and the flange switching portion is provided in a downward protruding manner. Accordingly, a wall length of the third vertical wall in the connection portion, at which stress concentration is likely to occur, can be increased, and the degree of stress concentration can be alleviated.

According to the configuration of the fifth aspect of the present invention, the outward flange has a flat portion at an end thereof. Accordingly, the concave wall portion and the outward flange can be formed with high accuracy.

According to the configuration of the sixth aspect of the present invention, the first vehicle-body attachment portion includes a front wall being a part of a first vertical wall, and a rear wall being a part of the third vertical wall and facing the front wall in a front-rear direction. Accordingly, a collar member that accommodates a cylindrical suspension bush can be attached thereto by welding or the like.

According to the configuration of the seventh aspect of the present invention, the second vehicle-body attachment portion includes an outer wall being a part of a second vertical wall, an inner wall being a part of the third vertical wall, a rear upper wall being a part of an upper wall, a first bottom wall being a part of the first inward flange, and a second bottom wall being a part of the second inward flange. Accordingly, a configuration adapted to a suspension bush of a type attached in the front-rear direction can be realized.

According to the configuration of the eighth aspect of the present invention, the second vehicle-body attachment portion includes the outer wall being a part of the second vertical wall, the inner wall being a part of the third vertical wall, the rear upper wall being a part of the upper wall, and a rear attachment hole that penetrates the rear upper wall. Accordingly, a configuration adapted to a suspension bush of a type attached in the vertical direction can be realized.

EMBODIMENT FOR CARRYING OUT THE INVENTION

Embodiments of a suspension arm for a vehicle according to the present invention will be explained below in detail with reference to FIG. 1 to FIG. 4. In the drawings, an x-axis, a y-axis, and a z-axis form a triaxial orthogonal coordinate system. A positive direction of the x-axis is a left direction of a vehicle body, a positive direction of the y-axis is a forward direction of the vehicle body, and a positive direction of the z-axis is an upward direction of the vehicle body. The direction of the z-axis may be referred to as "width direction", and the direction of the y-axis may be referred to as "front-rear direction (longitudinal direction)".

Figure 1:
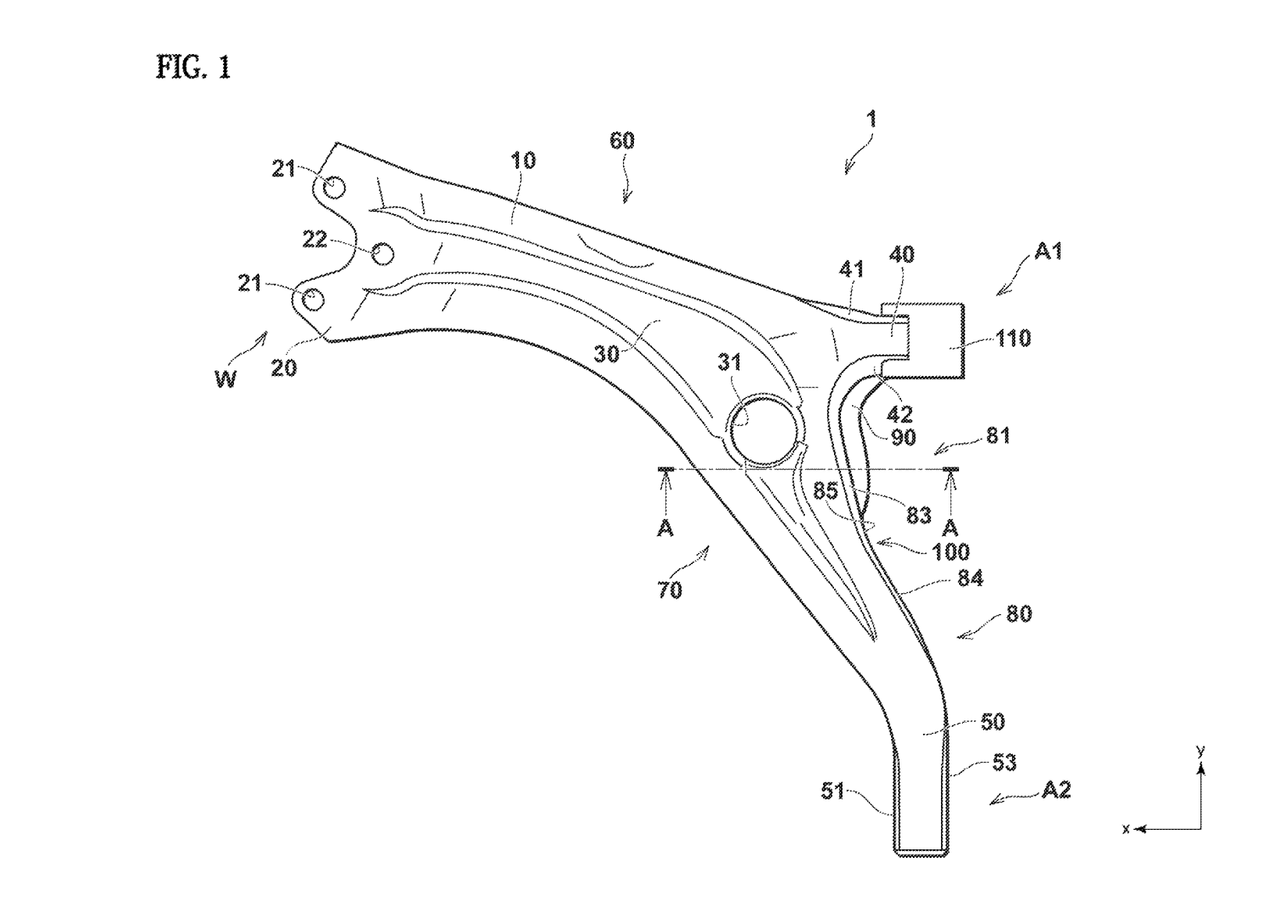
FIG. 1 is a top view of a suspension arm for a vehicle according to an embodiment of the present invention.
Figure 2:
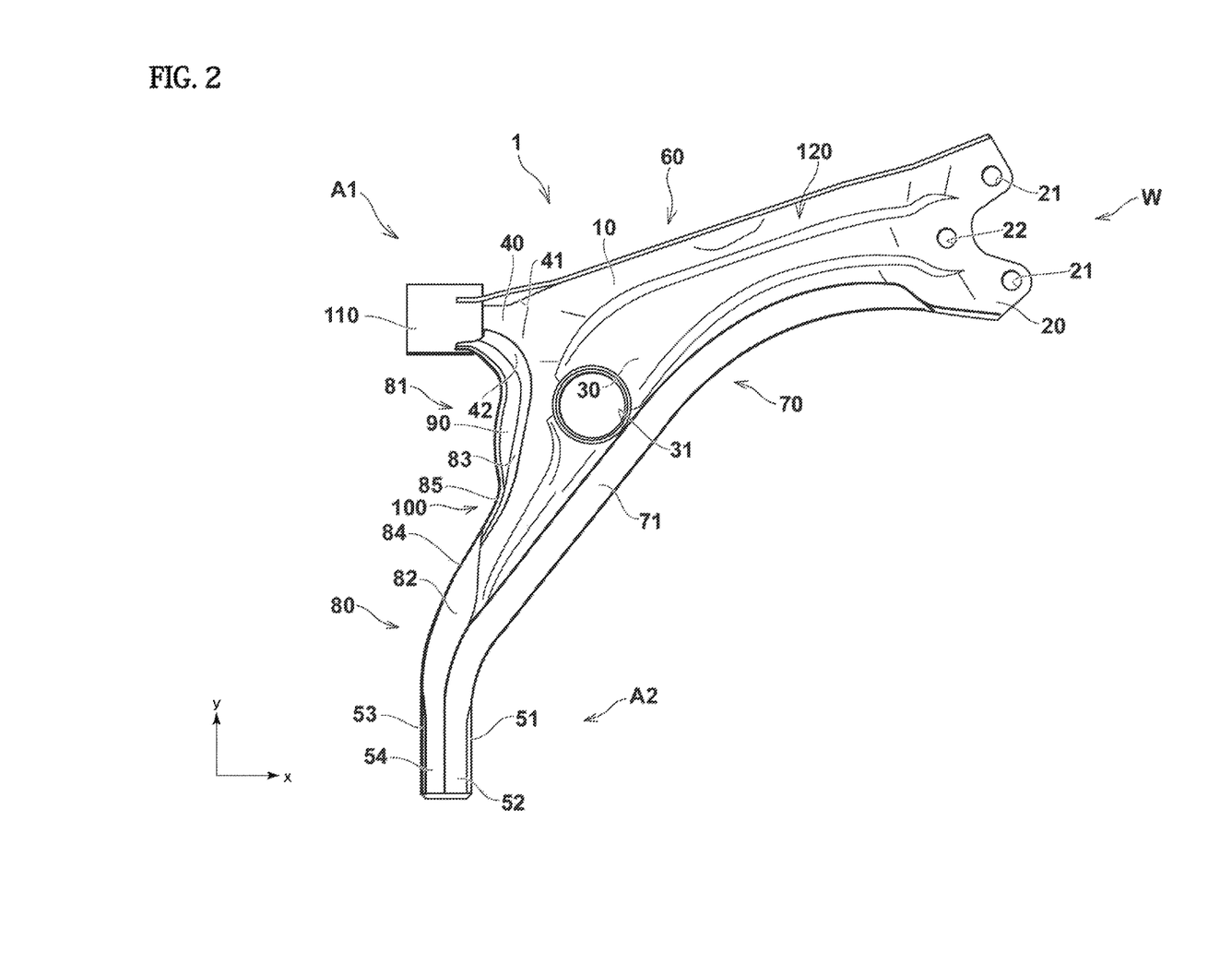
FIG. 2 is a bottom view of the suspension arm for a vehicle according to the present embodiment.
Figure 3:
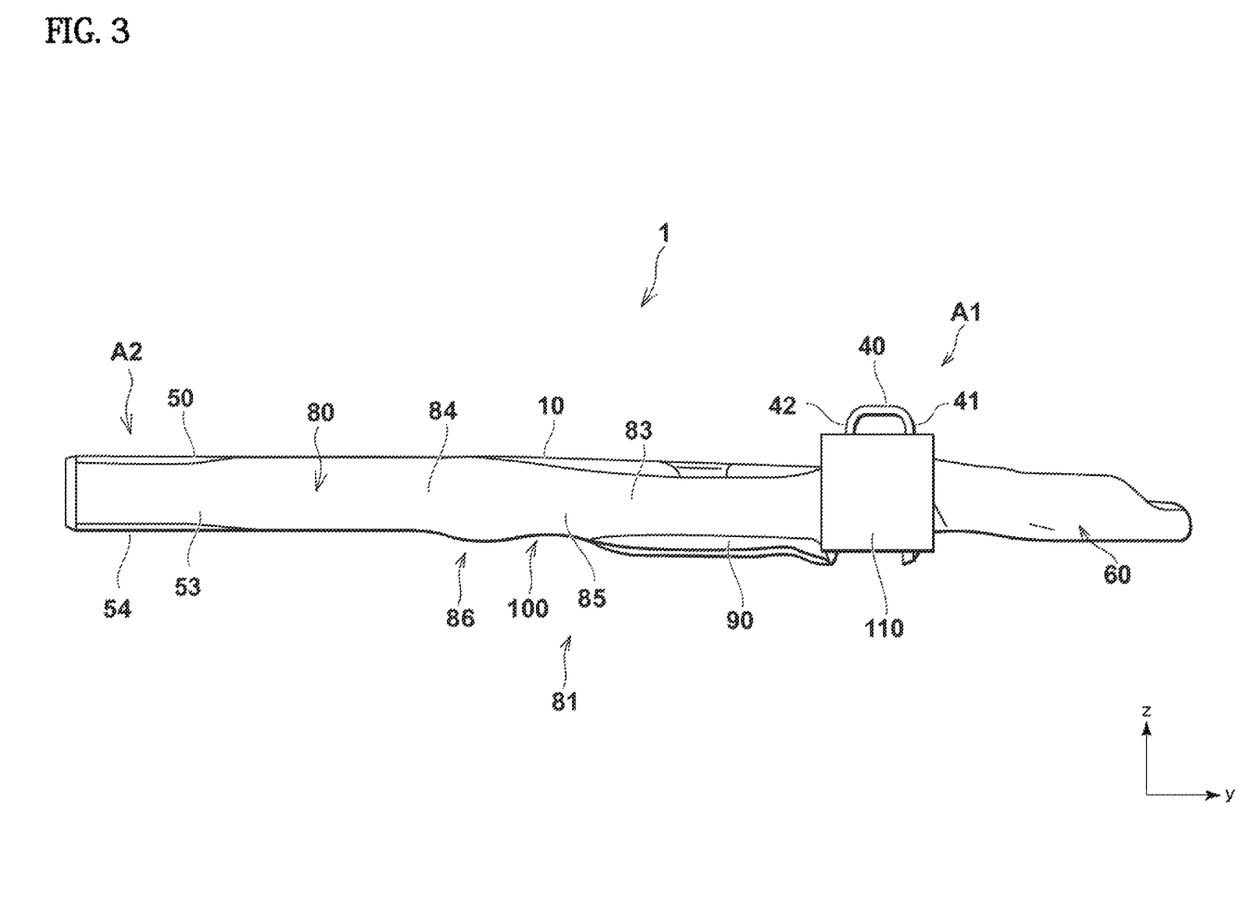
FIG. 3 is a right-side view of the suspension arm for a vehicle according to the present embodiment.
Figure 4:
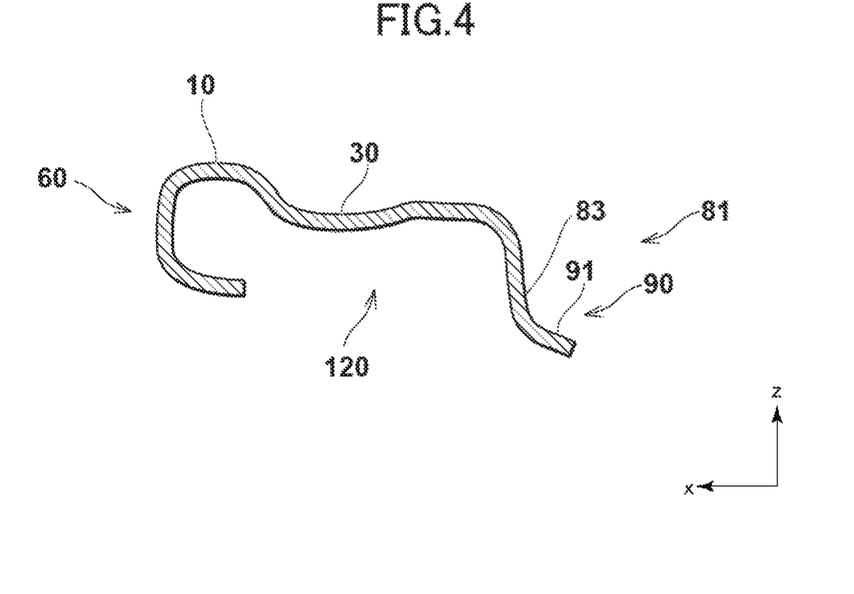
FIG. 4 is a sectional view along a line A-A in FIG. 1.

FIG. 1 is a top view of a suspension arm for a vehicle according to an embodiment of the present invention. FIG. 2 is a bottom view of the suspension arm for a vehicle according to the present embodiment. FIG. 3 is a right-side view of the suspension arm for a vehicle according to the present embodiment. FIG. 4 is a sectional view along a line A-A in FIG. 1.

As shown in FIG. 1 to FIG. 4, a suspension arm 1 according to the present embodiment is applied to a left-side lower arm of a vehicle such as an automobile. The suspension arm 1 is typically obtained by press forming of a flat plate-like member such as a steel plate, and is attached to a vehicle-body constituent member such as a sub-frame (not shown) via an elastic member (not shown). The right-side lower arm typically has a configuration in which the configuration of the left-side lower arm is reversed in the width direction (right and left reversed).

Specifically, the suspension arm 1 is a plate member having basically an upward convex shape, and includes an upper wall 10, a first vertical wall 60 that is suspended from a front end of the upper wall 10 and substantially extends in the width direction, a second vertical wall 70 that is suspended from a rear end of the upper wall 10 and extends substantially inclining between a left front side and a right rear side, and a third vertical wall 80 that is suspended from a right end of the upper wall 10 and substantially extends in the front-rear direction. An inner concave portion 120 being a concave portion inside the suspension arm 1 is defined by the upper wall 10, the first vertical wall 60, the second vertical wall 70, and the third vertical wall 80.

The upper wall 18 includes a flat portion 20 in which front and rear attachment holes 21, 21 formed by punching out the left end of the upper wall 10 to penetrate therethrough in a vertical direction and arranged to be juxtaposed in parallel in the front-rear direction, and a right attachment hole 22 formed by punching out the upper wall 10 to penetrate therethrough in the vertical direction on the right side of the front and rear attachment holes 21, 21 are provided respectively.

The upper wall 10 includes a depressed portion 30 depressed downward over the entire central part of the upper wall 10 and having a tool hole 31 formed by punching out the upper wall 10 to penetrate therethrough in the vertical direction. The upper wall 10 also includes a front upper wall 40 extending rightward from a right front portion of the depressed portion 30, and a rear upper wall 50 extending rearward from a right rear portion of the depressed portion 30.

The first vertical wall 60 forms a front wall 41 that is suspended from a front end of the front upper wall 40 at the right end of the first vertical wall 60, and the third vertical wall 80 forms a rear wall 42 that is suspended from a rear end of the front upper wall 40 at a front end of the third vertical wall 80, and faces the front wall 41 in the front-rear direction. A collar member 110 is fixed between the front wall 41 and the rear wall 42. When complicated processes at the time of press forming are permissible, a flange formed by folding a lower end of the first vertical wall 60 toward the inner concave portion 120 to bring the lower end closer to the inner concave portion 120 can be provided at the lower end of the first vertical wall 60 as required.

The second vertical wall 70 includes a first inward flange 71 formed by folding a lower end of the second vertical wall 70 excluding the left end thereof toward the inner concave portion 110 to bring the lower end closer to the inner concave portion 120 and being typically parallel to an x-y plane. The second vertical wall 70 forms an outer wall 51 that is suspended from a left end of the rear upper wall 50 at a rear end of the second vertical wall 70. The first inward flange 71 forms a first bottom wall 52 that is formed by folding a lower end of the outer wall 51 toward the inner concave portion 120 to bring the lower end closer to the inner concave portion 120 at a rear end of the first inward flange 71, and being typically parallel to the x-y plane.

The third vertical wall 80 includes a second inward flange 82 formed by folding a lower end of the third vertical wall 80 at the rear end thereof toward the inner concave portion 120 to bring the lower end closer to the inner concave portion 120 and being typically parallel to the x-y plane. The third vertical wall 80 forms an inner wall 53 that is suspended from a right end of the rear upper wall 50 at a rear end of the third vertical wall 80. The second inward flange 82 forms a second bottom wall 54 that is formed by folding a lower end of the inner wall 53 toward the inner concave portion 120 to bring the lower end closer to the inner concave portion 120 at a rear end of the second inward flange 82, and being typically parallel to the x-y plane.

The third vertical wall 80 forms a concave wall portion 81 provided in such a manner that the third vertical wall 80 is depressed toward the inner concave portion 120 between the rear wall 42 and the second inward flange 82, and also includes an outward flange 90 formed by continuously folding the respective lower ends of the concave wall portion 81 and the rear wall 42 at the left parts thereof to the opposite side to the inner concave portion 120 so as to be away from the inner concave portion 120. The outward flange 30 is provided to extend over the concave wall portion 81 and the rear wall 42 and connect them so as to take into consideration increase in the strength and the stiffness of the third vertical wall 80 in the concave wall portion 81 and the rear wall 42 being a constituent element of a vehicle attachment portion. An opening angle of the outward flange 90 with respect to the concave wall portion 81 is desired to be an obtuse angle, if press formability of the outward flange 90 is taken into consideration. It is desired to provide the second inward flange 82 so as to extend at least between the inner wall 53 and the concave wall portion 81 and to extend forward from the inner wall 53 spanning over the concave wall portion 81, that is, the second inward flange 82 extends over the inner wall 53 and the concave wall portion 81 and connect them, in terms of improving the strength and the stiffness of the suspension arm 1.

A flange switching portion 100, which is a part where a lower end of the concave wall portion 81 is suspended without being folded, is provided to switch the second inward flange 82 and the outward flange 90 with each other corresponding to within the range of the concave wall portion 81 between the second inward flange 82 and the outward flange 30. The flange switching portion 100 is provided to a limited extent in the concave wall portion 81 so as to take into consideration accurate formation of the shapes of the second inward flange 82 and the outward flange 90 provided in the concave wall portion 81, while appropriately ensuring the material flow of the base material particularly at the time of press forming. By providing the flange switching portion 100, respective lengths of extension of the second inward flange 82, the outward flange 90, and the flange switching portion 100 can be relatively adjusted, and the number of processes at the time of press forming of the second inward flange 82 and the outward flange 90 can be reduced.

There may be a minute flange-shaped portion at the respective ends of the second inward flange 82 and the outward flange 90 in the front-rear direction due to an angle R or the like remaining at the connection portion with the third vertical wall 80. However, a portion where the lower end of the concave wall portion 81 is directly suspended in a portion other than the minute flange-shaped portion corresponds to the flange switching portion 100.

It is desired that a first flat wall 83, in which the lower end of the third vertical wall 80 is connected to the outward flange 90, is provided in the third vertical wall 80 on the front side of the flange switching portion 100 as a part of the third vertical wall 80, and a second flat wall 84, in which the lower end of the third vertical wall 80 is connected to the second inward flange 82, is provided in the third vertical wall 80 on the rear side of the flange switching portion 100 as a part of the third vertical wall 80. It is further desired that a curved wall 85 depressed toward the inner concave portion 120 is provided in the third vertical wall 80 in the concave wall portion 81 between the first flat wall 83 and the second flat wall 84, and the flange switching portion 100 is provided corresponding to the curved wall 85. The first flat wall 83 and the second flat wall 84 are provided in this manner and the flange switching portion 100 is provided corresponding to the curved wall 85 provided between the first flat wall 83 and the second flat wall 84. This is because the first flat wall 83 and the second flat wall 84 can improve the shape fixability of the concave wall portion 81 particularly at the time of press forming, thereby enabling to form the shape of the curved wall 85, which has a tendency of being difficult to obtain an accurate shape, with higher accuracy, and the flange switching portion 100 provided in the curved wall 85 can form the shapes of the second inward flange 82 and the outward flange 90 with higher accuracy by appropriately ensuring the material flow of the base material at the time of press forming. It is also desired from a viewpoint of increasing the shape fixability at the time of press forming that the first flat wall 83 and the second flat wall 84 respectively have wall lengths that cover the entire area of the corresponding third vertical wall 80 in the vertical direction. The outward flange 90 and the first flat wall 83 are not necessarily connected with each other, and the second inward flange 82 and the second flat wall 84 are not necessarily connected with each other. However, it is desired to connect the outward flange 90 and the first flat wall 83 with each other, and the second inward flange 82 and the second flat wall 84 with each other correspondingly, if the press formability, the strength, and the like of the suspension arm 1 are taken into consideration.

Further, it is desired that the third vertical wall 30 in a connection portion 86 between the second inward flange 82 and the flange switching portion 100 forms a projecting portion projecting downward. The third vertical wall 80 in the connection portion 86 is projected downward so as to take into consideration alleviation in the degree of stress concentration in the connection portion 86 by increasing a wall length of the third vertical wall 80 in the connection portion 86 between the second inward flange 82 and the flange switching portion 100 having a tendency of stress concentration. It is further desired from a viewpoint of alleviating the degree of stress concentration that the projecting portion of the connection portion 86 and the second inward flange 82 are connected in a gentle R shape.

It is desired from a viewpoint of forming the shapes of the concave wall portion 81 and the outward flange 90 more accurately that the tip of the outward flange 90 is formed in the flat portion 91. Further, when complicated processes at the time of press forming are permissible, the tip of the outward flange 90 can be formed in a curved shape.

The suspension arm 1 having the configuration described above is typically an L-type lower arm of a front suspension, and two portions of a first vehicle-body attachment portion A1 being an attachment portion on the front side, and a second vehicle-body attachment portion A2 being an attachment portion on the rear side are set as portions to be attached to a vehicle-body constituent member, and a wheel attachment portion W is set as a portion to which a wheel member is attached. The wheel attachment portion W and the first vehicle-body attachment portion A1 are connected to each other by the upper wall 10 and the first vertical wall 60, the wheel attachment portion W and the second vehicle-body attachment portion A2 are connected to each other by the upper wall 10 and the second vertical wall 70, and the first vehicle-body attachment portion A1 and the second vehicle-body attachment portion A2 are connected to each other by the upper wall 10 and the third vertical wall 80.

More specifically, the first vehicle-body attachment portion A1 is arranged corresponding to the collar member 110 fixedly provided between the front wall 41 and the rear wall 42. In the first vehicle-body attachment portion A1, after a cylindrical rubber bush (not shown) has been press-fitted to the inside of the collar member 110, a fastening member such as a bolt (not shown) is inserted into a through hole of the rubber bush and an attachment member on the vehicle body side, and the rubber bush is fastened to the vehicle-body constituent member (not shown) via the fastening member, thereby attaching the first vehicle-body attachment portion A1 to the vehicle-body constituent member. When complicated processes at the time of press forming are permissible, a cylindrical portion formed by a burring process can be respectively formed in the front wall 41 and the rear wall 42 to form a holding portion of the rubber bush.

The second vehicle-body attachment portion A2 is arranged corresponding to the rear upper wall 50, the outer wall 51, the inner wall 53, the first bottom wall 52, and the second bottom wall 54. In the second vehicle-body attachment portion A2, after a cylindrical rubber bush (not shown) has been press-fitted to a cylindrical portion formed by the rear upper wall 50, the outer wall 51, the inner wall 53, the first bottom wall 52, and the second bottom wall 54 via a through hole thereof, the rubber bush is covered with a bracket (not shown) from a lower side thereof, and the bracket in this state is fastened to the vehicle-body constituent member via a fastening member such as a bolt (not shown), thereby attaching the second vehicle-body attachment portion A2 to the vehicle-body constituent member.

The wheel attachment portion W is arranged corresponding to the front and rear attachment holes 21, 21 and the right attachment hole 22 provided on the flat portion 20. In the wheel attachment portion W, after a fastening member such as a bolt has been inserted into the attachment holes 21, 21 and the right attachment hole 22 respectively in a state with a knuckle member (not shown) being supported by the flat portion 20 from a lower side thereof, the fastening member is fastened in a fastening hole of the knuckle member corresponding thereto, thereby attaching the knuckle member to the suspension arm 1.

In the configurations of the present embodiment described above, various modifications, particularly, a modification regarding the second vehicle-body attachment portion A2 can be considered. Therefore, such a modification is described below in detail with reference to FIG. 5 and FIG. 6.

Figure 5:
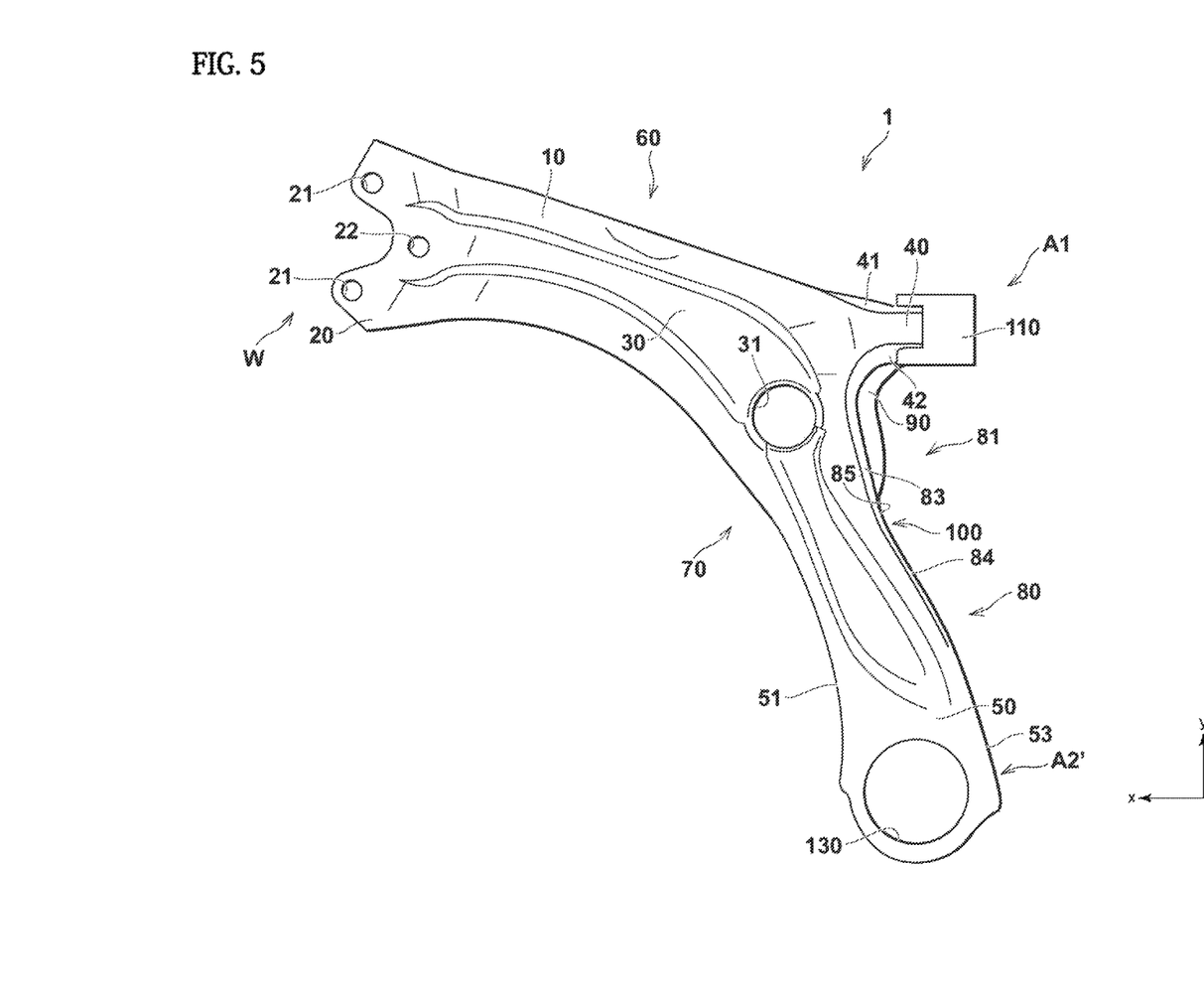
FIG. 5 is a top view of a suspension arm for a vehicle according to a modification of the present embodiment.
Figure 6:
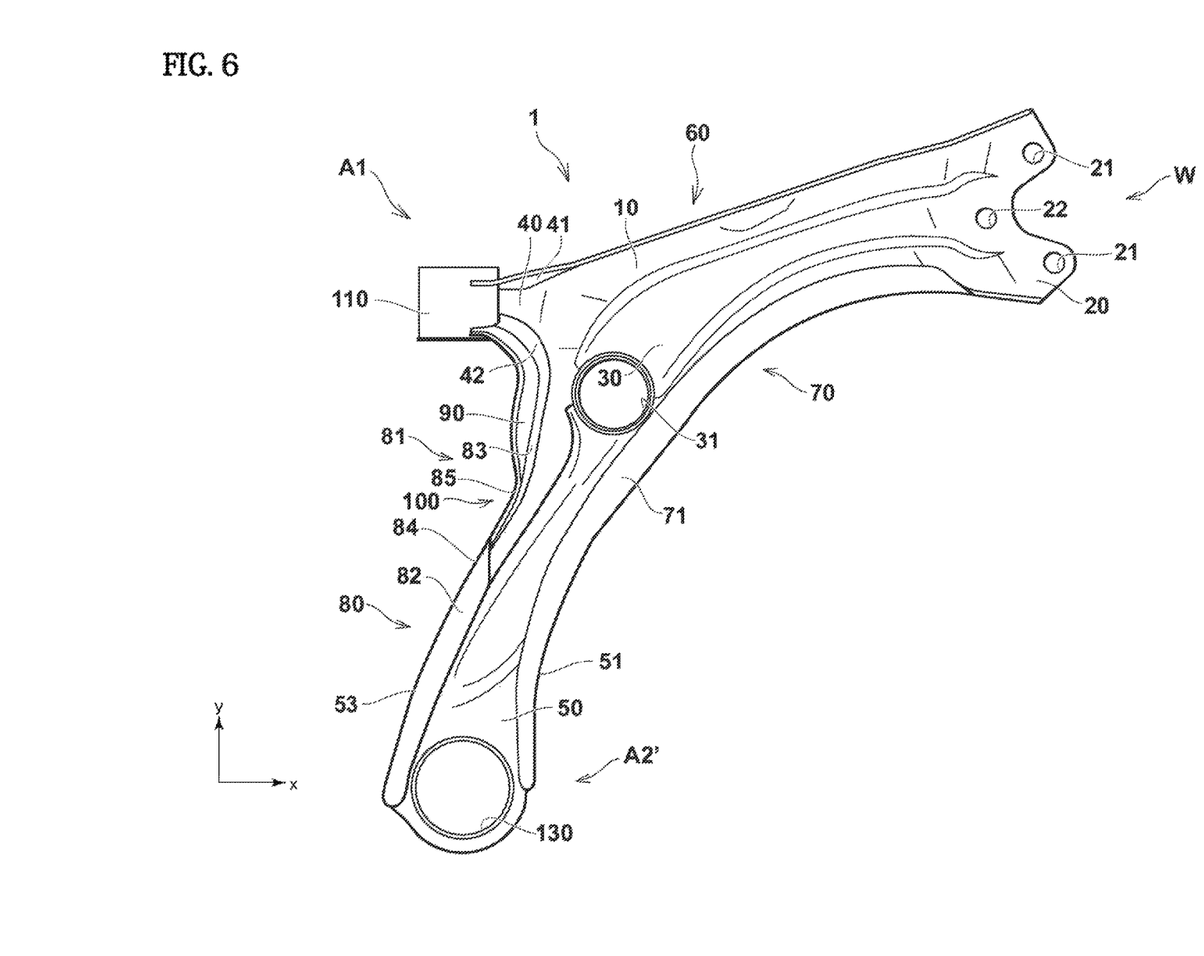
FIG. 6 is a bottom view of the suspension arm for a vehicle according to the modification of the present embodiment.

FIG. 5 is a top view of a suspension arm for a vehicle according to a modification of the present embodiment. FIG. 6 is a bottom view of the suspension arm for a vehicle according to the modification of the present embodiment.

As illustrated in FIG. 5 and FIG. 6, in a second vehicle-body attachment portion A2' of the present modification, instead of the cylindrical portion formed by the rear upper wall 50, the outer wall 51, the inner wall 53, the first bottom wall 52, and the second bottom wall 54, a rear attachment hole 130 formed by punching out the rear upper wall 50 to penetrate therethrough in a vertical direction is provided. That is, the second vehicle-body attachment portion A2' is arranged corresponding to the rear attachment hole 130 in addition to the rear upper wall 50, the outer wall 51, and the inner wall 53.

More specifically, the rear attachment hole 130 is formed in the rear upper wall 50 surrounded by the outer wall 51 and the inner wall 53 on the right and left sides, thereby increasing the strength and the stiffness around the rear attachment hole 130. In the second vehicle-body attachment portion A2' having such a configuration, after an annular rubber bush (not shown) is press-fitted into the rear attachment hole 130, a fastening member such as a bolt (not shown) is inserted into a through hole of the rubber bush and an attachment member on the vehicle body side, and the rubber bush is fastened to a vehicle-body constituent member (not shown) via the fastening member, thereby attaching the second vehicle-body attachment portion A2' to the vehicle-body constituent member. When complicated processes at the time of press forming are permissible, a cylindrical portion formed by a burring process can be formed around the rear attachment hole 130 to form a holding portion of the rubber bush.

In the present invention, the type, form, arrangement, number, and the like of the constituent members are not limited to those in the embodiment explained above, and it is needless to mention that the constituent elements can foe modified as appropriate without departing from the scope of the invention, such as appropriately replacing these elements by other ones having identical operational effects.

INDUSTRIAL APPLICABILITY

As described above, according to the present invention, a suspension arm for a vehicle that can increase the strength and the stiffness, while ensuring required productivity, can be provided with a simple configuration. Therefore, because of its general purposes and universal characteristics, applications of the present invention can be expected in a wide range in a field of a suspension arm of a movable body such as a vehicle.

The invention claimed is:

1. A suspension arm for a vehicle comprising:
a wheel attachment portion to which wheels are attached;
a first vehicle-body attachment portion provided at a position inside in a width direction of a vehicle body with respect to the wheel attachment portion;
a second vehicle-body attachment portion provided at a position on a rear side in a front-rear direction of the vehicle body with respect to the first vehicle-body attachment portion;
a first vertical wall that extends to connect the wheel attachment portion and the first vehicle-body attachment portion with each other;
a second vertical wall that extends to connect the wheel attachment portion and the second vehicle-body attachment portion with each other;
a third vertical wall that extends to connect the first vehicle-body attachment portion and the second vehicle-body attachment portion with each other;
an upper wall that extends to connect an upper end of the first vertical wall, an upper end of the second vertical wall, and an upper end of the third vertical wall with each other;
an inner concave portion defined by the first vertical wall, the second vertical wall, the third vertical wall, and the upper wall, and opening downward in a vertical direction of the vehicle body;
a concave wall portion provided in such a manner that the third vertical wall is depressed toward the inner concave portion between the first vehicle-body attachment portion and the second vehicle-body attachment portion;
a first inward flange that is a portion obtained by folding a lower end of the second vertical wall on the second vehicle-body attachment portion side toward the inner concave portion;
a second inward flange that is a portion obtained by folding a lower end of the third vertical wall on the second vehicle-body attachment portion side toward the inner concave portion; and
an outward flange obtained by folding a lower end of the third vertical wall on the first vehicle-body attachment portion side toward an opposite side to the inner concave portion, wherein
the second inward flange extends at least between the second vehicle-body attachment portion and the concave wall portion,
the outward flange extends over the first vehicle-body attachment portion and the concave wall portion, and
a flange switching portion where the second inward flange and the outward flange are switched with each other is provided between the second inward flange and tire outward flange corresponding to a portion where a lower end of the concave wall portion extends to be suspended to the downward side without folding the lower end of the concave wall portion.

2. The suspension arm for a vehicle according to claim 1, wherein the flange switching portion is provided in a curved wall that connects a first flat wall located on the first vehicle-body attachment portion side with a second flat wall located on the second vehicle-body attachment portion side.

3. The suspension arm for a vehicle according to claim 1, wherein the second inward flange extends over the second vehicle-body attachment portion and the concave wall portion.

4. The suspension arm for a vehicle according to claim 1, wherein the third vertical wall in a connection portion between the second inward flange and the flange switching portion is provided in a protruding manner to the downward side.

5. The suspension arm for a vehicle according to claim 1, wherein the outward flange includes a flat portion at an end thereof.

6. The suspension arm for a vehicle according to claim 1, wherein the first vehicle-body attachment portion includes a front wall being a part of the first vertical wall, and a rear wall being a part of the third vertical wall and facing the front wall in the front-rear direction.

7. The suspension arm for a vehicle according to claim 1, wherein the second vehicle-body attachment portion includes an outer wall being a part of the second vertical wall, an inner wall being a part of the third vertical wall, a rear upper wall being a part of the upper wall, a first bottom wall being a part of the first inward flange, and a second bottom wall being a part of the second inward flange.

8. The suspension arm for a vehicle according to claim 1, wherein the second vehicle-body attachment portion includes an outer wall being a part of the second vertical wall, an inner wall being a part of the third vertical wall, a rear upper wall being a part of the upper wall, and a rear attachment hole that penetrates the rear upper wall.

* * * * *